(12) United States Patent
Jenkins et al.

(10) Patent No.: US 6,283,324 B1
(45) Date of Patent: Sep. 4, 2001

(54) COIN ROLL DISPENSING APPARATUS

(76) Inventors: Stuart M. Jenkins, 105 Aldwick Road, Bogner Regis, WEst Sussex P021 2NY (GB); Derek Haynes, 676 Thrush Ct., Marco Isl., FL (US) 34145

( * ) Notice: Subject to any disclaimer, the term of this patent is extended or adjusted under 35 U.S.C. 154(b) by 0 days.

(21) Appl. No.: 09/478,549

(22) Filed: Jan. 6, 2000

Related U.S. Application Data

(60) Provisional application No. 60/115,042, filed on Jan. 8, 1999.

(51) Int. Cl.[7] .................................................. B65H 3/00
(52) U.S. Cl. ............................................. 221/192; 221/289
(58) Field of Search ................................ 221/77, 253, 85, 221/79, 225, 191, 192, 227, 131, 289, 251

(56) References Cited

U.S. PATENT DOCUMENTS 4,483,459 * 11/1984 Taylor et al. ........................ 221/192
6,098,841 * 8/2000 Katakai ................................ 221/289

* cited by examiner

Primary Examiner—Kenneth W. Noland
(74) Attorney, Agent, or Firm—John P. McGonagle

(57) ABSTRACT

In a coin dispensing apparatus having a plurality of magazines arranged one above another for storing rolls of coins, each magazine having a coin roll outlet at one end and an opposite rear end, said apparatus having a lifting conveyor having a plurality of hods which interact with the outlet of the magazine to receive coin rolls therefrom, said apparatus having a plurality of shelves for supporting the magazines in position with a spacing between them the same as the spacing of the hods along the lifting conveyor, each said shelf having an underside with a bracket attached thereto, each said shelf having an end nearest to the lifting conveyor, said apparatus having a dispensing outlet adapted to receive and dispense coin rolls transported thereto by the lifting conveyor, a lever attached to each shelf, said lever being geometrically arranged to automatically interrelate with a coin roll about to be fed from a magazine into an empty hod position, a coin roll waiting to be fed from the magazine immediately above and adjacent to this position, and a coin roll being transported in the hod between adjacent magazine levels.

6 Claims, 4 Drawing Sheets

COIN ROLL DISPENSING APPARATUS

This Application claims benefit of Provisional No. 60/115,042 filed Jan. 8, 1999.

BACKGROUND OF THE INVENTION

This invention relates to a coin dispensing apparatus, and more particularly to an improvement in the apparatus for the storage and dispensing of wrapped rolls of coins.

Current coin dispensing machines are normally of the hopper storage type which require the coins to be stored in bulk. This creates problems for an operator loading the hopper because of the considerable weight of the coins involved and the physical effort required to load the hopper.

Existing hopper delivery systems require coins or coin rolls to be loaded into the top of the hopper. The coin rolls are then delivered at the bottom of the hopper. This has a disadvantage in that the coin rolls are not delivered at a convenient height to the operator. It is generally impractical to mount the coin dispensing apparatus at a higher level due to the considerable weight of the coins involved and the need to lift the coins up to the higher level when loading the hopper.

Applicants' co-pending application, Ser. No. 09/084,159, filed May 23, 1998, "Coin Dispensing Apparatus", and incorporated herein by reference, is aimed at overcoming the above described problem and disadvantage with existing hopper delivery systems. The present invention provides a further improvement over the prior art, especially with respect to the coin roll magazines in applicants' co-pending application.

Experience has shown that plastic wrapped coin rolls create a high friction load on the drive mechanism of applicant' coin roll dispensing machines. The resulting pressure on the coin rolls can lead to damage to the plastic wrap, especially when being dispensed, as well as requiring increased power to operate the machine.

SUMMARY OF THE INVENTION

The present invention incorporates by reference the coin dispensing apparatus of applicants' co-pending application specified above. Briefly, applicants are providing a coin dispensing apparatus under microprocessor control comprising a lifting conveyor with a plurality of hods incrementally driven by the lifting conveyor, an optional transporting conveyor having a plurality of hods incrementally driven by the transporting conveyor, the hods of each conveyor combining with each other and at least one magazine the outlet of which interfaces with the hods of the lifting conveyor to transfer rolls of coins stored in the or each magazine to the said hods and thereafter to transfer them to either to the hods of the transporting conveyor for delivery to a dispensing outlet or directly to a dispensing outlet.

Preferably, the conveyors are both driven by a single electric motor. Alternatively, each conveyor may be driven by a separate electric motor.

In a prior construction the magazine or magazines have an automatically operated chock at their outlet end to release the flow of rolls of coins from the or each magazine, when placed in the apparatus and is automatically closed before the or each magazine is removed from the apparatus. The chock can conveniently be operated from a releasable locking mechanism at the rear of the magazine. The magazine may include a constant force spring connected with a slidable packing plate at the rear of the magazine to apply pressure to the rolls of coins in the magazine to urge them towards the magazine outlet.

In a preferred construction the coin changer dispenser has a housing divided into two parts, a lower armour plated secure safe for the coin dispensing apparatus and an upper part for housing a computer controlled means for accepting and delivering bank notes and delivering the coin rolls.

Applicants' co-pending coin dispensing apparatus has been modified in this application as follows. A lever is provided at each magazine level. The lever controls the flow of the coin rolls into hods, incrementally, driven by the transporting conveyor. This lever is geometrically arranged to automatically interrelate with: (i) the coin roll about to be fed from a magazine into an empty hod position, (ii) the coin roll waiting to be fed from the magazine immediately above and adjacent to this position, and (iii) the coin rolls being transported in the hod between adjacent magazine levels.

Each lever is held in the above described controlling position by successive coin rolls in each magazine until that magazine becomes empty of coin rolls. When this state occurs, the lever drops freely from gravity to allow the magazine immediately adjacent and above to begin to feed coin rolls when the next empty hod position becomes available.

Another feature of the present invention is the insertion of each coin roll magazine through the side of the dispenser and the use of a detachable clip retainer to hold the coin rolls in the magazine while the magazine is being transported to the dispenser.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
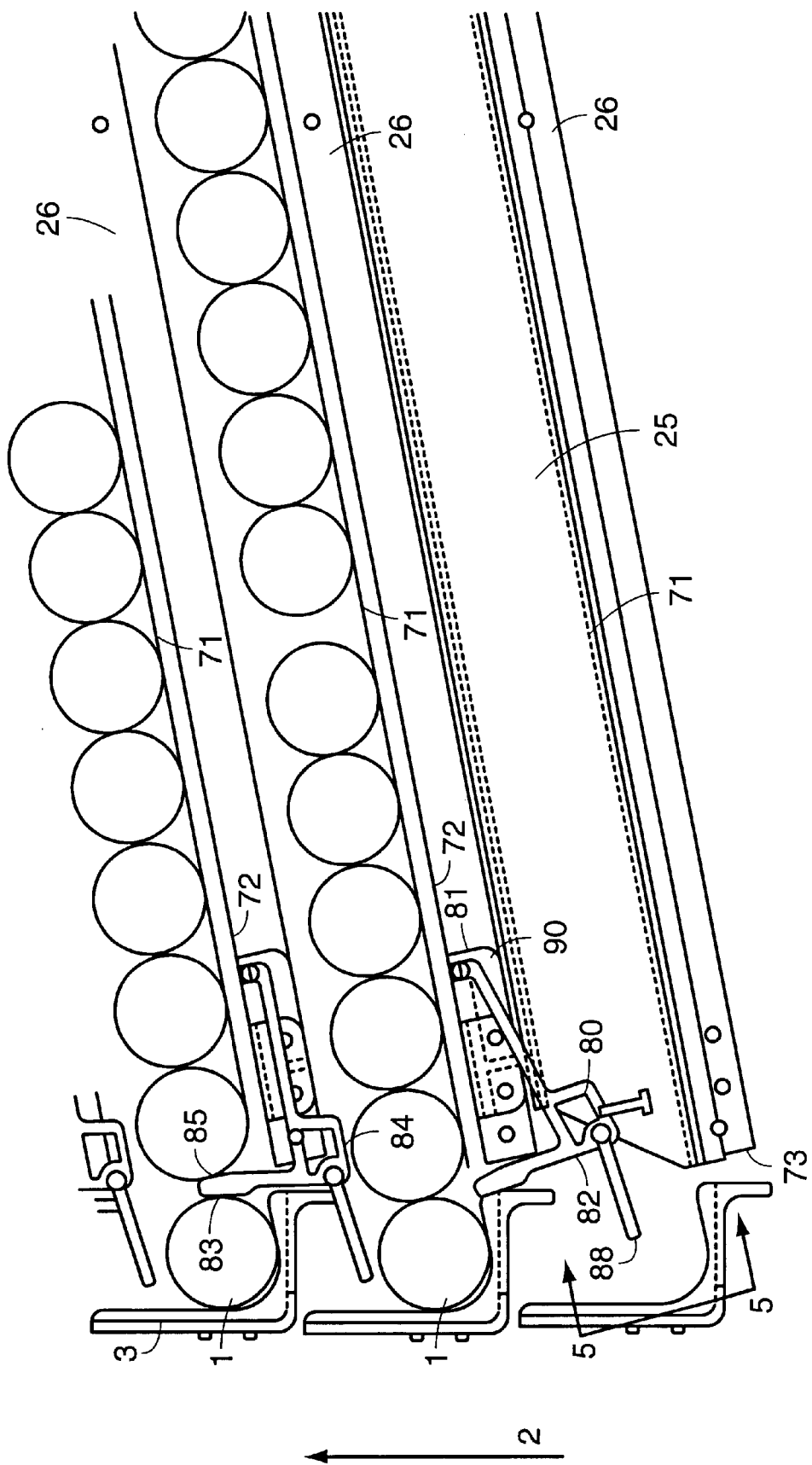
FIG. 1 is a fragmentary side elevation of a coin dispensing apparatus according to the invention including a transporting conveyor at the position in which a hod is receiving a coin roll from a magazine.
Figure 3:
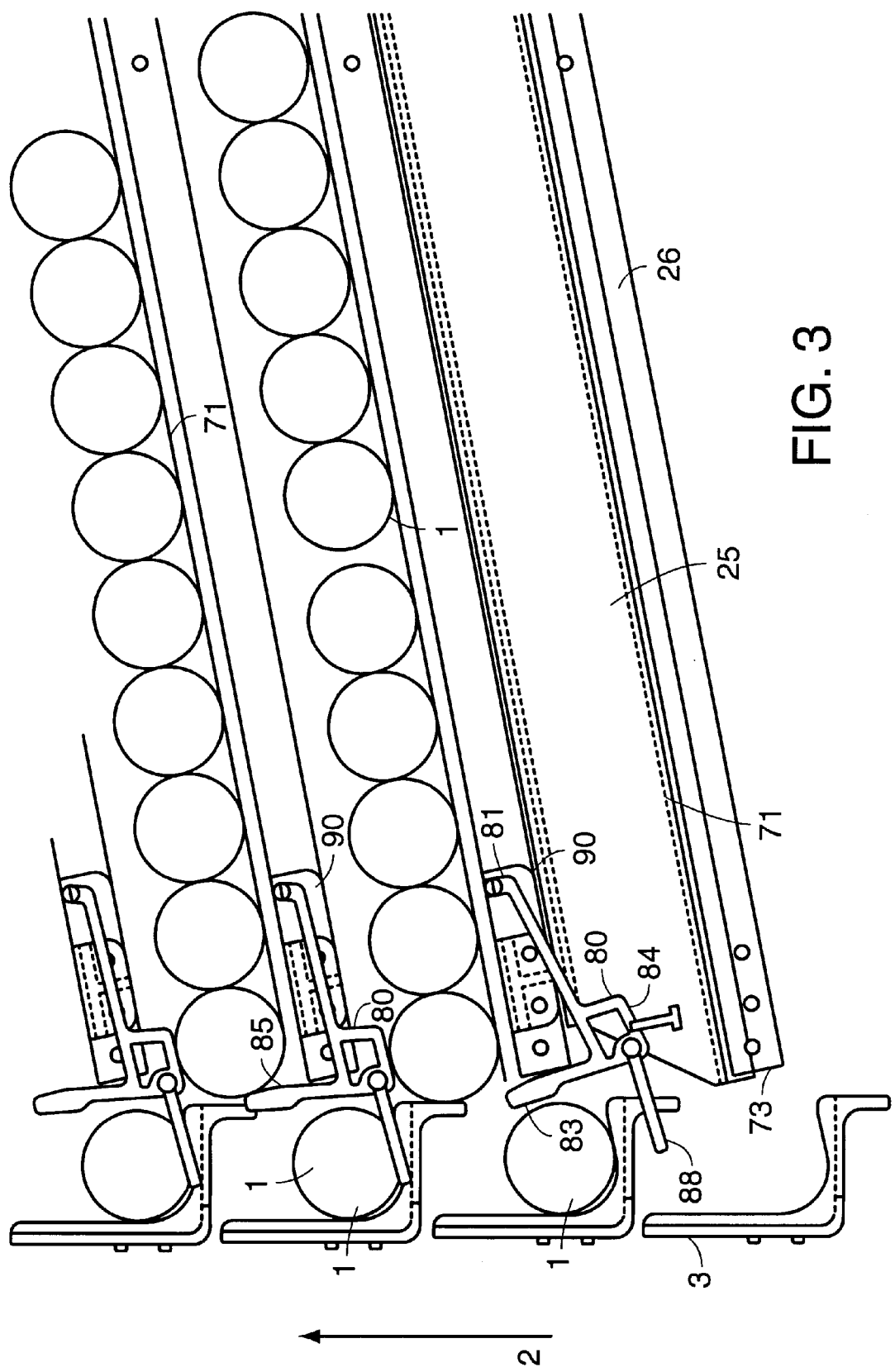
FIG. 3 is a fragmentary side elevation of a coin dispensing apparatus according to the invention including the transporter conveyor at the position in which a magazine is feeding coin rolls in to a hod position and the lever is controlling the coin rolls in the magazine adjacent and immediately above that position.
Figure 4:
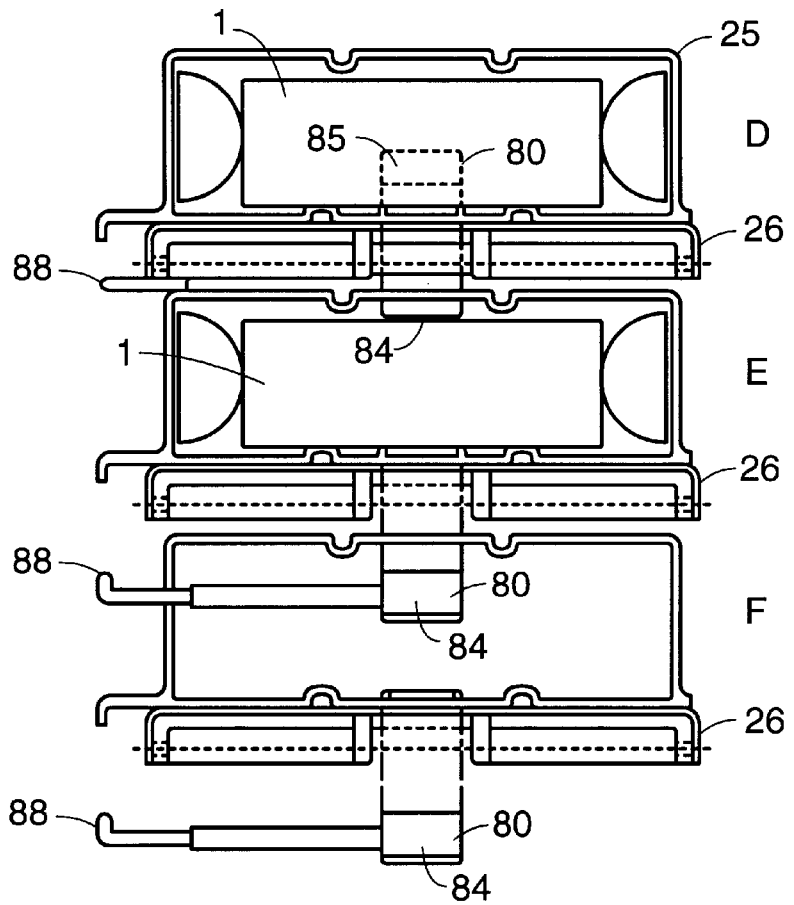
FIG. 4 is a fragmentary cross section taken along the line 4—4 showing of FIG. 2 showing a magazine waiting to dispense coin rolls at D, dispensing coin rolls at E, and empty at F.
Figure 5:
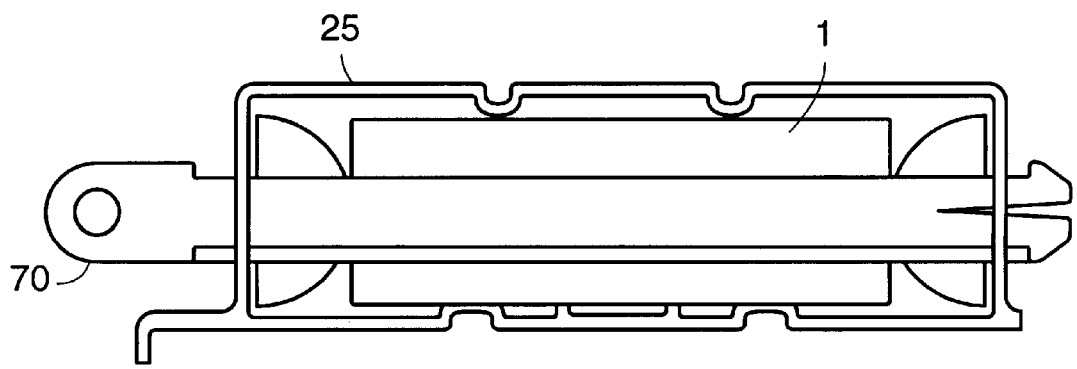
FIG. 5 is a fragmentary cross section taken along the line 5—5 of FIG. 1 prior to removal of the clip retainer.

Referring to the drawings in detail wherein like elements are indicated by like numerals, there is shown an improvement in the magazine dispensing portion of a coin roll dispensing apparatus. The invention is a modification to our co-pending application for a coin roll dispensing apparatus described above, wherein a lifting conveyor is described and referred to generally as 2, with a plurality of hods 3 driven by an endless chain (not shown for clarity) and a plurality of shelves 26; supporting a plurality of magazines 25. The magazines 25, only one of which is shown for clarity in FIGS. 1 and 3, are inserted from the side of the dispenser. The coin rolls 1 are contained in a magazine 25 by means of a clip retainer 70. See FIG. 5. The clip retainer 70 is subsequently removed after the magazines 25 have been loaded into the dispenser. The level of the coin rolls 1 in a magazine 25 is indicated by the line 71.

Figure 2:
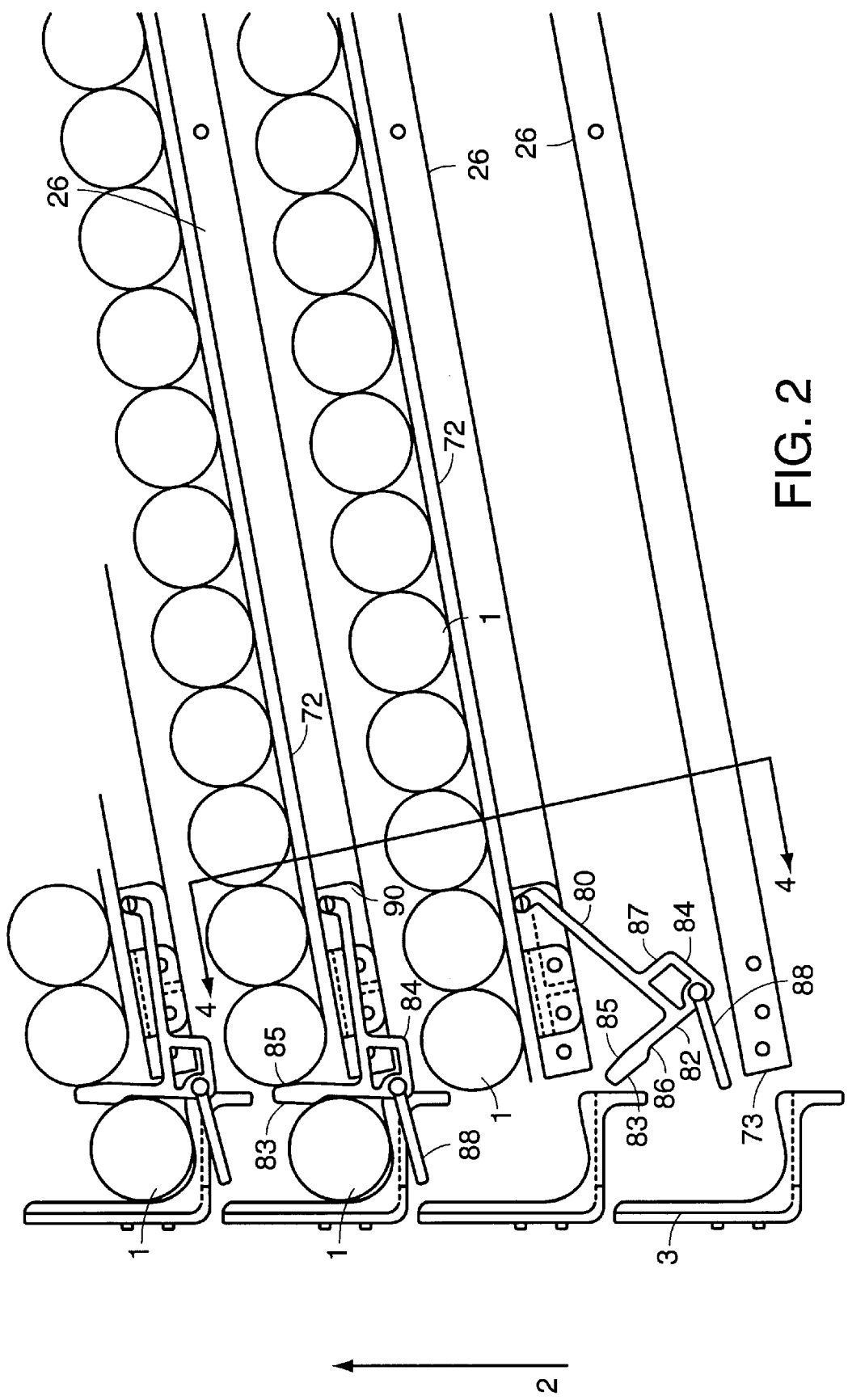
FIG. 2 is a fragmentary side elevation of a coin dispensing apparatus according to the invention including the transporter conveyor at the position in which a hod containing a coin roll is lifting the lever to allow a coin roll to feed into an empty hod.

Each shelf 26 has a lever 80 attached thereto. Each lever has a proximal end 81 and a distal end 82. The lever proximal end 81 is pivotally attached to a bracket 90 which in turn is fixedly attached to the underside 72 of a shelf 26 near to the shelf end 73 nearest to the lifting conveyor 2. Each shelf underside 72 has a bracket 90 attached thereto. As may be best seen in FIG. 2, the lever distal end 82 is unattached and terminates in a T-shaped element 86 with a lower connecting element 87. The lever 80 configuration results in three operational/functional surfaces. The T-element 86 has an inner surface 85 facing toward the lever proximal end 81 and an opposite outer surface 83 facing away from the lever proximal end 81. The lower connecting element 87 has a bottom surface 84 generally perpendicular to the T-element inner and outer surfaces 85, 83. The T-element outer surface 83 is designated the first surface 83 and is controlled by the coin rolls 1 carried upwards in the hods 3. The lower connecting element bottom surface 84 is designated the second surface 84 rests on and is controlled by the coin rolls 1 in the magazines 25. The T-element inner surface 85 is designated the third surface 85 and controls the coin rolls 1 in the magazine 25 immediately above the lever 80. The lower connecting element 87 has an extension element 88 connected thereto.

In operation, the lever 80 must be lifted by hand and is so by means of the extension element 88. This allows entry of a magazine 25 onto a shelf 26 in the dispenser. When the extension element 88 is released, the second surface 84 rests on the coin rolls 1 in the magazine beneath it. The dispenser is loaded with magazines 25 from the bottom up. When this is complete, the clip retainer 70 is removed from each magazine 25 in a bottom up sequence to release the coin rolls 1. The coin rolls 1 roll forward to rest against the lever third surface 85, with the exception of the lowest magazine position, in which the coin rolls 1 roll forward into an open hod 3 as shown in FIG. 1.

The weight of the coin rolls 1 in the lever third surface 85 creates a downward pressure by the lever second surface 84 on the coin roll 1 beneath it. See FIG. 3. This pressure can impede the passage of coin rolls 1. However, this pressure is momentarily relieved by the engagement between a coin roll 1 in an adjacent hod 3 and the first lever surface 83 when it is driven incrementally between one magazine level and the next thus relieving the pressure created by the lever second surface 84 on the coin roll 1 beneath it.

When the last coin roll 1 from a magazine 25 is delivered to a hod 3 and clears the next higher magazine position, thus presenting an empty hod 3 to the lever first surface 83, the pressure on the lever third surface 85 is unopposed and the lever 80 pivots downward and inward, out of the way of the lifting conveyor 2.

Due to the interaction between the lever first surface 83 and third surface 85, the arrangement of the present invention greatly reduces the friction load in the dispenser.

It is understood that the above-described embodiment is merely illustrative of the application. Other embodiments may be readily devised by those skilled in the art which will embody the principles of the invention and fall within the spirit and scope thereof.

We claim:

1. In a coin dispensing apparatus hiving a plurality of magazines arranged one above another for storing rolls of coins, each magazine having a coin roll outlet at one end and an opposite rear end, said apparatus having a lifting conveyor having a plurality of hods which interact with the outlet of the magazine to receive coin rolls therefrom, said apparatus having a plurality of shelves for supporting the magazines in position with a spacing between them the same as the spacing of the hods along the lifting conveyor, each said shelf having an underside with a bracket attached thereto, each said shelf having an end nearest to the lifting conveyor, said apparatus having a dispensing outlet adapted to receive and dispense coin rolls transported thereto by the lifting conveyor, a lever attached to each shelf, said lever being geometrically arranged to automatically interrelate with a coin roll about to be fed from a magazine into an empty hod position, a coin roll waiting to be fed from the magazine immediately above and adjacent to this position, and a coin roll being transported in the hod between adjacent magazine levels, said lever comprising:

a proximal end and a distal end, the lever proximal end being pivotally attached to the bracket attached to the underside of the shelf near to the shelf end nearest to the lifting conveyor, said lever distal end being unattached and terminating in a T-shaped element with a lower connecting element, said lower connecting element having an extension element connected thereto.

2. A lever as recited in claim 1, wherein said lever has three operational and functional surfaces, comprising:

a first surface comprising a T-element opposite outer surface facing away from the lever proximal end;

a second surface comprising a lower connecting element bottom surface generally perpendicular to the T-element inner and outer surfaces; and a third surface comprising a T-element inner surface facing toward the lever proximal end;

wherein said first surface is controlled by the coin rolls carried upwards in the hods;

wherein said second surface rests on and is controlled by the coin rolls in the magazines;

wherein said third surface controls the coin rolls in the magazine immediately above the lever.

3. A lever as recited in claim 2, wherein:

each lever is held in a controlling position by successive coin rolls in each magazine until that magazine becomes empty of coin rolls, whereupon the lever is adapted to drop freely from gravity to allow the magazine immediately adjacent and above to begin to feed coin rolls when the next empty hod position becomes available.

4. A lever as recited in claim 3, wherein:

the lever is adapted to be lifted by hand by means of the extension element;

wherein a magazine may be entered onto the shelf in the dispensing apparatus.

5. A lever as recited in claim 4, wherein:

said second surface is adapted to rest on the coin rolls in the magazine beneath it when the extension element is released.

6. A lever as recited in claim 5, further comprising:
a removable clip retainer adapted to hold the coin rolls in a magazine;
  wherein, upon removal of said clip retainer, said coin rolls roll forward to rest against the lever third surface;
  wherein the weight of the coin rolls on the lever third surface creates a downward pressure by the lever second surface on the coin roll beneath it;
    wherein said downward pressure is momentarily relieved by the engagement between a coin roll in an adjacent hod and the first lever surface when it is driven incrementally between one magazine level and the next thus relieving the pressure created by the lever second surface on the coin roll 1 beneath it;
  wherein as the last coin roll from a magazine is delivered to a hod and clears the next higher magazine position, thus presenting an empty hod to the lever first surface, the pressure on the lever third surface is unopposed and the lever pivots downward and inward, out of the way of the lifting conveyor.

* * * * *